(12) United States Patent  (10) Patent No.: US 8,583,601 B1
Claudatos et al.  (45) Date of Patent: Nov. 12, 2013

(54) IMMINENT FAILURE BACKUP

(75) Inventors: Christopher Hercules Claudatos, San Jose, CA (US); William Dale Andruss, Minneapolis, MN (US)

(73) Assignee: EMC Corporation, Hopkinton, MA (US)

( * ) Notice: Subject to any disclaimer, the term of this patent is extended or adjusted under 35 U.S.C. 154(b) by 716 days.

(21) Appl. No.: 11/904,975

(22) Filed: Sep. 28, 2007

(51) Int. Cl.
  *G06F 7/00* (2006.01)
  *G06F 17/00* (2006.01)

(52) U.S. Cl.
  USPC .......................................... 707/654; 707/640

(58) Field of Classification Search
  USPC .......................................... 707/204, 640, 654
  See application file for complete search history.

(56) References Cited

U.S. PATENT DOCUMENTS

| | | | |
|---|---|---|---|
| 5,659,614 A | 8/1997 | Bailey, III | |
| 5,966,730 A | 10/1999 | Zulch | |
| 6,148,372 A | 11/2000 | Mehrotra et al. | |
| 6,226,759 B1 | 5/2001 | Miller et al. | |
| 6,496,949 B1 | 12/2002 | Kanevsky et al. | |
| 6,880,051 B2 | 4/2005 | Timpanaro-Perrotta | |
| 6,982,842 B2 * | 1/2006 | Jing et al. | 360/31 |
| 6,999,978 B2 | 2/2006 | Frank et al. | |
| 7,073,036 B2 | 7/2006 | Furuya et al. | |
| 7,103,740 B1 | 9/2006 | Colgrove et al. | |
| 7,146,387 B1 * | 12/2006 | Russo et al. | 1/1 |
| 7,231,502 B2 | 6/2007 | Lam et al. | |
| 7,266,718 B2 | 9/2007 | Idei et al. | |
| 7,318,095 B2 * | 1/2008 | Husain et al. | 709/224 |
| 7,412,583 B2 * | 8/2008 | Burton et al. | 711/170 |
| 7,418,464 B2 | 8/2008 | Cannon et al. | |
| 7,529,785 B1 | 5/2009 | Spertus et al. | |
| 7,529,830 B2 | 5/2009 | Fujii | |
| 7,620,843 B2 | 11/2009 | Zohar et al. | |
| 7,657,796 B1 | 2/2010 | Kaiser et al. | |
| 7,694,092 B2 | 4/2010 | Mizuno | |
| 2002/0013832 A1 | 1/2002 | Hubbard | |
| 2002/0103908 A1 | 8/2002 | Rouse et al. | |
| 2003/0120772 A1 * | 6/2003 | Husain et al. | 709/224 |
| 2003/0145226 A1 | 7/2003 | Bruton et al. | |
| 2003/0177324 A1 | 9/2003 | Timpanaro-Perrotta | |
| 2003/0212716 A1 | 11/2003 | Steele et al. | |
| 2004/0034672 A1 * | 2/2004 | Inagaki | 707/204 |
| 2004/0049519 A1 | 3/2004 | Itakura et al. | |
| 2004/0051988 A1 * | 3/2004 | Jing et al. | 360/31 |
| 2004/0073676 A1 | 4/2004 | Honma et al. | |
| 2005/0076070 A1 * | 4/2005 | Mikami | 707/204 |
| 2005/0138310 A1 | 6/2005 | Horiuchi | |
| 2005/0177767 A1 | 8/2005 | Furuya et al. | |
| 2005/0257085 A1 | 11/2005 | Haustein et al. | |
| 2006/0167838 A1 | 7/2006 | Lacapra | |
| 2007/0055660 A1 | 3/2007 | Anderson | |
| 2007/0112892 A1 | 5/2007 | Langley et al. | |
| 2007/0130599 A1 | 6/2007 | Monroe | |
| 2007/0136286 A1 | 6/2007 | Webster et al. | |

(Continued)

*Primary Examiner* — Apu Mofiz
*Assistant Examiner* — Jared Bibbee
(74) *Attorney, Agent, or Firm* — Deepika Bhayana; Theodore A. Chen; Krishnendu Gupta

(57) ABSTRACT

A method, article of manufacture, and apparatus for backing up or archiving objects in the event of imminent failure, comprising receiving an indication of imminent failure, determining a target, and backing up the objects to the target. The target may be determined by the nature of the imminent failure, and may be selected to be the fastest available target. More than one target may be selected, and more than one connection may be used to transfer objects.

3 Claims, 3 Drawing Sheets

(56) References Cited

U.S. PATENT DOCUMENTS

| | | |
|---|---|---|
| 2007/0136375 A1 | 6/2007 | Ando et al. |
| 2007/0136541 A1* | 6/2007 | Herz et al. .................... 711/162 |
| 2007/0168715 A1* | 7/2007 | Herz et al. ...................... 714/13 |
| 2007/0180058 A1 | 8/2007 | Wu et al. |
| 2007/0226213 A1 | 9/2007 | Al-Masri |
| 2007/0254697 A1 | 11/2007 | Sugio et al. |
| 2007/0271316 A1 | 11/2007 | Hollebeek |
| 2008/0028008 A1 | 1/2008 | Brunet et al. |
| 2008/0034249 A1* | 2/2008 | Husain et al. ..................... 714/3 |
| 2008/0046483 A1* | 2/2008 | Lehr et al. ..................... 707/204 |
| 2008/0072002 A1 | 3/2008 | Kuwahara et al. |
| 2008/0177825 A1 | 7/2008 | Dubinko et al. |
| 2008/0222376 A1* | 9/2008 | Burton et al. ................. 711/162 |
| 2008/0263551 A1* | 10/2008 | Ali et al. ....................... 718/102 |
| 2008/0270823 A1* | 10/2008 | Hare et al. ........................ 714/5 |
| 2008/0282253 A1 | 11/2008 | Huizenga |

\* cited by examiner

IMMINENT FAILURE BACKUP

FIELD OF THE INVENTION

This invention relates generally to backup, and more particularly to systems and methods for performing backup or archive operations on data.

BACKGROUND OF THE INVENTION

This invention relates to systems and methods for performing backup or archive operations on data. Typically, backups are initiated automatically according to a schedule. Backups may also be initiated manually by a user or administrator, in which case the backup may proceed immediately upon manual initiation. Other backup technologies exist that provide so-called "continuous" protection in that they create copies of the protected system's data upon write or write-close operations. These systems may create local or external caches that temporarily hold the copied data as a staging location for the data, prior to replication to the backup or archive location. The cache may be emptied or "flushed", based on time intervals, storage limits, number of files accumulated, available connectivity, upon authorization by a server, etc. The cache may also be flushed based on a combination of triggers.

These various methods provide reasonable means of protecting data. However, data loss may still occur upon a failure of the protected system or the backup system, because there may be some data that has not been backed up when the failure occurs. There is a need, therefore, for an improved method, article of manufacture, and apparatus for performing backup operations on data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
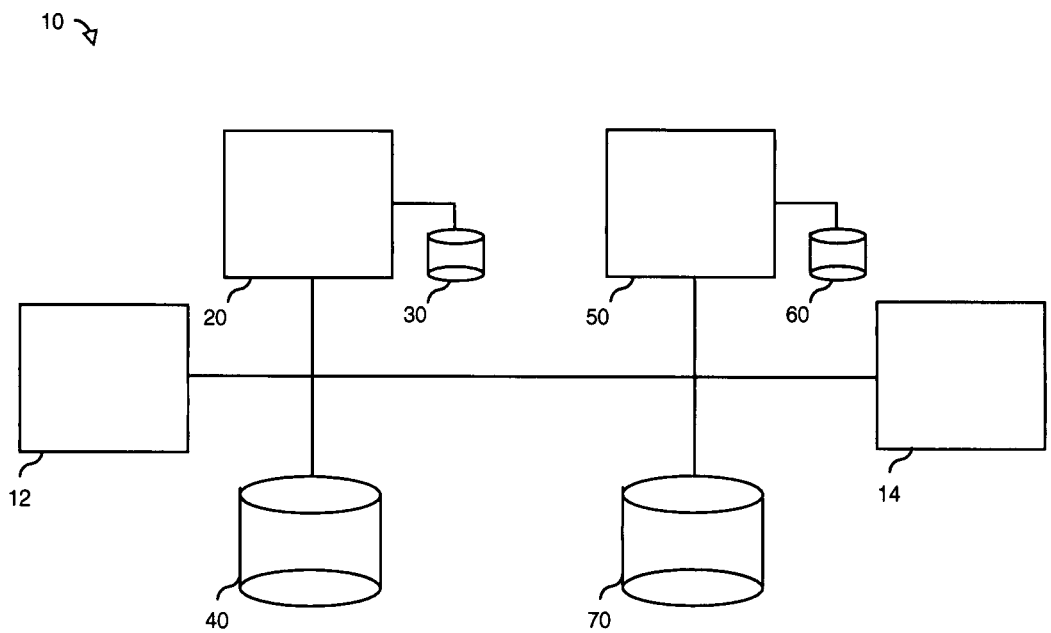
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a computer system on which a backup program executes, but it should be understood that the principles of the invention are not limited to this particular configuration. Rather, they may be applied to any system in which data is transmitted across a connection to a remote device, and the system may comprise one or more devices. The system may comprise a personal computer, personal digital assistant (PDA), mobile phone, or other electronic device. Although the methods herein are described in terms of their application to performing backup operations on data, one skilled in the art will recognize that they are equally applicable to other cases for which it is desirable to transfer data across a connection, including but not limited to restore, replication, archiving, and transmission. For example, the principles disclosed herein may be applied to replication, to rapidly create a functionally useful replication set at another location. Backup of information and data is not limited to disk-image or file-based backups, and may be of any type or combination that results in a sufficient copy of the appropriate disk and data elements. The terms "files" and "data" are used herein to refer to objects, but it should be understood that the disclosure is not restricted to files. The disclosure applies equally to block level backup, image level backup, or any combination or variation of these, and to any data objects used in a backup, restore, replication, archive, or transmission process or part of a backup, restore, replication, archive, or transmission process. Disclosed herein are a method and system to back up data, in a manner that provides backup protection to a system as effectively as possible.

FIG. 1 illustrates a configuration in which a backup and restore system 10 comprising a backup program could be used to back up data. Backup server 20 communicates with host system 50 over a network (e.g., a local area network, wide area network, etc.). Host system 50 may have a backup client executing on it, and may have storage systems 60 and/or 70 on which its data is stored. Host system 50 may send its backups to storage system 40 or storage system 30 attached to backup server 20. When restore operations are performed, backup data from storage system 40 or storage system 30 may be restored to storage system 60 or storage system 70 for use by the host system 50. An agent executing on system 12 may be used to scan the backup to determine prioritization of the files or data stored on storage system 30 or storage system 40. In one embodiment, the agent executing on system 14 may be used to scan the files or data on storage system 60 or 70. In some embodiments, the agent may execute on backup server 20 or system 50. The agent may be used to capture information about usage of the files or data. It will be understood that the agent may execute on any of the systems shown or on other systems, and that more than one agent may be used. Various configurations are possible, and the principles disclosed herein are not limited to the embodiment disclosed.

Backups may be full, incremental, or differential. A full backup may be performed, and files that have changed since the last backup (the last full backup or any backup) may be backed up. Thereafter, backups may be restored as needed, to the original system or device, or another system or device. Typical backup systems back up data in arbitrary order, such as in the order the data appeared on the original system (e.g., within the backup or archive pool). Similarly, replication systems may arbitrarily transmit data in the order that they appear on the source system. However, the majority of the files/data contained in the backup set (or set to be replicated) are often not in need of immediate protection or as important to the user or system as other files. Data backup/archival is performed according to the arbitrary order of the data within the backup pool or archive, without any sense of priority in relationship to user or application importance or urgency. This is typical of file-based and image-based backup technologies. These backups or replications are typically performed according to time intervals, storage limits, number of files accumulated, available connectivity, upon authorization by a server, or other criteria. Such backups do not take into account the condition of the systems with respect to the possibility of failure, including imminent failures. Systems may fail during the backup process or prior to the initiation of a backup, when some data may not have been backed up, and it is advantageous to have a copy of the most valuable and most current data up to the point of failure.

There may be warning of imminent failure in some cases. The backup system 10 (or one of its elements, such as backup server 20 or host system 50) may use a notification (such as a message, signal, flag, etc.) indicating possibility of imminent failure of a component or system to initiate a backup/archive session. In this manner, a backup will hopefully be made before failure occurs, thereby preserving data.

The condition and health of a system and its components may be monitored by a variety of methods. In one embodiment, the health of hard drives may be monitored and reported by a technology known as S.M.A.R.T. (Self-Monitoring, Analysis, and Reporting Technology). This technology or others may be used to determine that failure of a specific disk drive (or other system components) is imminent. An immediate backup session may be initiated, based on this determination, such as by issuing a notification of imminent failure, and automatically or manually initiating a backup. Other methods of monitoring the system may involve software for managing systems, infrastructures, applications, networks, etc. Any type of failure prediction or detection system may be used to determine the risk of imminent failure and provide notification, including but not limited to one of the many systems based on S.M.A.R.T. technology.

The backup system 10 may be configured to receive such triggers in a variety of modes, such as:

1) Polling —a system may poll another system (which may be integrated, co-resident, or external) for system health status, and if the poll results in a "notification" of imminent failure, a backup may be initiated.

2) Interrupt Driven —a system may receive an interrupt from a health status system, and a notification of imminent failure may be used to initiate a backup.

3) Manual—an imminent failure backup session may be manually invoked by a user or administrator.

There may be only a brief period of time between the determination that a failure may be imminent and the time of actual failure. During this time, data is considered at greater risk for loss or corruption, and it is desirable to preserve the data intact as soon as possible. The time of failure may be indeterminate, and as time elapses, there may be an increased risk of loss or damage to data that has not been backed up. Furthermore, the failure may occur while the backup process is taking place, and not all of the data may be backed up before the failure occurs. Although it would be desirable to ensure that no data is lost or corrupted, it may not be technologically or economically feasible to do so. Thus, it may be advantageous to choose a method that provides the greatest degree of protection in the least amount of time.

In some embodiments, prioritized backup may be used upon an indication of imminent failure. Prioritized backup may involve backing up files or objects in order of their importance to an affected user, owner, or application. The prioritization of a file for backup may be based on its type, time of last modification, time of last use, owner's identity or role, etc. The prioritization of the file may also be determined based on its relationship to the imminent failure. For example, if the imminent failure notification indicates that a hard drive is failing, files known to be stored on that physical device may be prioritized for backup, and files known to be stored on other physical devices may be given lower priority (or no priority) for backup.

Backup sessions typically have a pre-defined scope of protection, in which the backup covers specific files, folders, or entire volumes, depending on a configuration determined by the administrator or user. In some embodiments, a backup session may be initiated by imminent failure of the system or drive. Based on the predicted failure a prioritized backup session may be initiated, and files may be selected for backup in accordance with the predicted failure and/or backup according to their individual degree of importance and value. The impact of failure is mitigated because the most valuable data elements are backed up first and data elements of lesser value are backed up next, and so on until the backup session is completed.

In some embodiments, prioritization of files in imminent failure backup may be different from prioritization of files in a normal backup. For example, in a normal backup, the prioritization policy or criteria may specify that the most recent ".doc" and ".xls" files have priority over all other files, and they are to be ordered by timestamp (most recent first). The files may be sorted by type and sorted (or subsorted) by timestamp. However, in the event of an imminent failure, the prioritization criteria may additionally specify that new ".doc" and ".xls" files (i.e., files that are newly created and have no previous version) are to have higher priority than the same file types that have previous versions, even though they may have more recent revisions or timestamps. By using this policy, it is likely that a copy of a newly created file will be backed up even though the revised version of a previous file may not be. The rationale is that previous versions of the file already exist at the backup site whereas no version of the newly created file exists anywhere except on the system that is in danger of imminent failure. By backing up this file first, there is some assurance that a greater number of valuable files/data elements are preserved. In some embodiments, the imminent failure backup prioritization policy might give priority to files that are known to be stored on the failing device.

Figure 2:
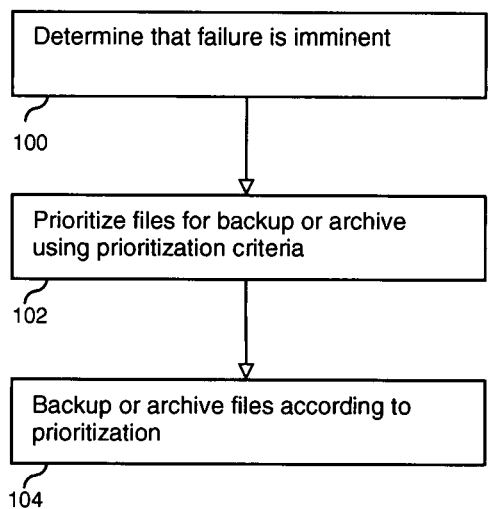
FIG. 2 is a flowchart illustrating a process for prioritizing and backing up data in some embodiments of the invention.

A process flow illustrating an embodiment is shown in FIG. 2. It is determined that a failure is imminent, step 100. Files are prioritized for backup or archive using prioritization criteria, step 102. In step 104, the files are backed up according to the prioritization.

In some embodiments, dynamic policies may be used in performing backups triggered by imminent failure notifications. Policies may be used to specify prioritized backups, the criteria for prioritizing files, the backup target, etc. Based on pre-established policies, a system configured to perform imminent failure backup may perform a prioritized backup with the standard or current prioritization policy, or it may invoke and apply a policy that is specific to the triggering event.

The fact that failure is imminent may change the retention value and prioritization of certain documents. In some embodiments, it may be more advantageous to have copies of new files that have not been previously backed up, than to have a copy of the latest version of a file that has been previously backed up. In some embodiments, the opposite may be true, and this determination may be made by the administrator or user. The policy may be used to implement the desired method of preserving the most valuable data. In some embodiments, dynamic policies may be assigned broadly across an entire system or applied uniquely to discrete data protection sub-domains such as individual users' data or individual applications' data.

Figure 3:
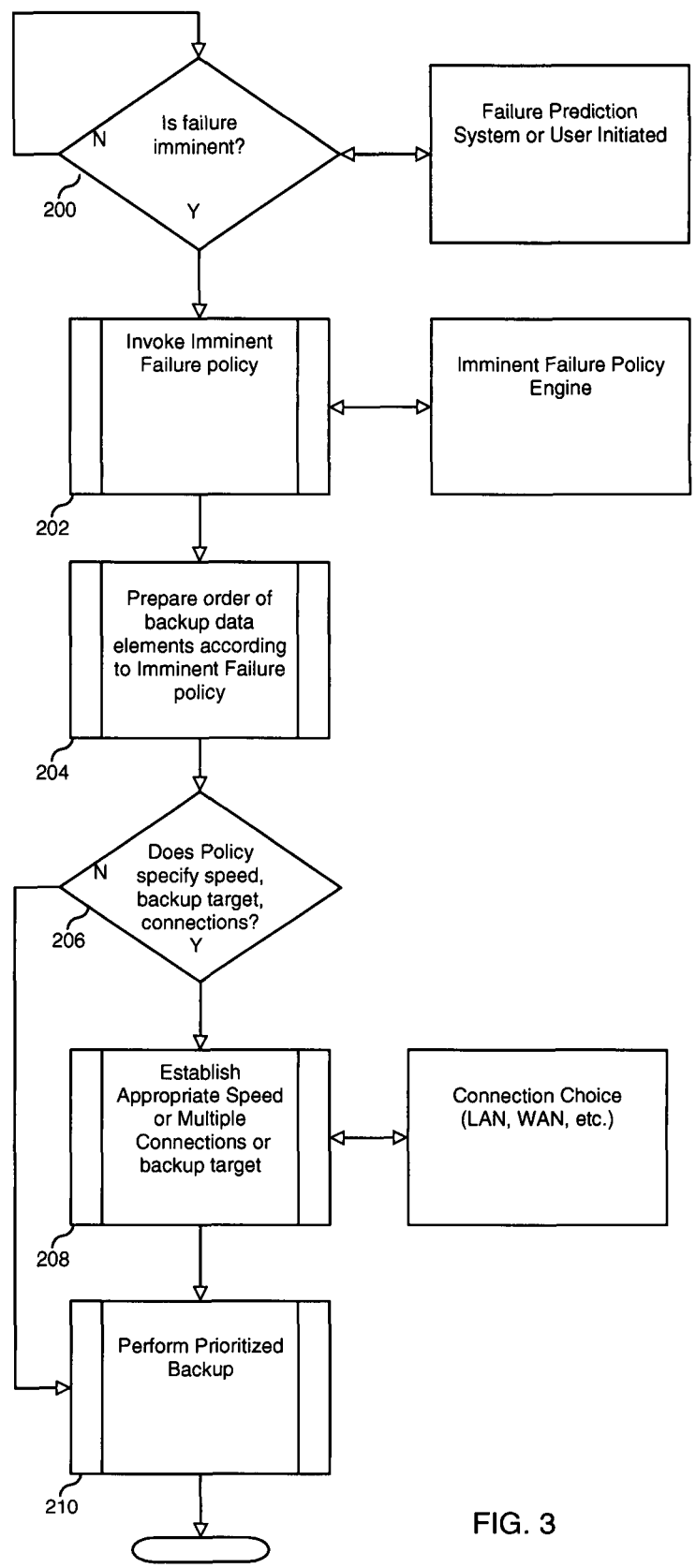
FIG. 3 is a flowchart illustrating a process for backing up data in some embodiments of the invention.

FIG. 3 illustrates a process flow in some embodiments. An imminent failure condition is detected, and the system is notified of the imminent failure, step 200. The imminent failure condition may be detected by the host system 50, storage system 70, any component in the system 10, an external monitoring system, etc. or may be manually set. Notification may be sent to any component in the system 10. In some embodiments, the host system 50 may be notified of the impending failure in, for example, storage 60, and send a request to backup server 20 to initiate a backup immediately. In some embodiments, the backup server 20 may receive notification of imminent failure relating to host system 50, and initiate backup. In some embodiments, the notification of imminent failure may be used to trigger a policy, step 202, which may specify initiating backup immediately, and specify various parameters to be used in the backup, such as whether to prioritize files, prioritization criteria to be used, files to be backed up, backup target, etc. The policy triggered may depend on the nature of the imminent failure, and specify different actions and parameters based on the specific failure threatened. The policy is applied, step 204, by performing the prescribed actions in accordance with the prescribed criteria, and these may be performed by various components in the system 10. For example, if the imminent failure relates to storage 60, an agent on system 12 may determine the prioritization of files on that storage 60, and provide the prioritization to backup server 20 to direct backup of files in accordance with the prioritization.

In some embodiments, it may be desirable to have the backup occur to a different location than the usual backup target, over a different or multiple connections, or at higher speeds (such as over networks where different speeds and priorities may be requested), etc. and the process may check this, step 206. The appropriate targets, speeds, connections, etc. are established, step 208. This may be done in order to shorten the backup time by using higher bandwidth connections, and/or in order to expedite a post-failure recovery operation. For example, a remote office may be connected to a headquarters location via a T1 data connection. This is a relatively low-bandwidth connection providing a maximum of 1.5 mbps. Backups take place either regularly or continuously from the server to the headquarters backup target over the WAN through the T1 connection. It may be advantageous to have the backup take place over a LAN connection or other higher speed connection to a backup target at the remote office (local to the system being backed up) in order to optimize the backup speed. The backup may not run long enough to complete the entire backup, and a faster connection will result in more data being backed up. Data backed up to the backup target at the remote office may be replicated or transmitted over the WAN to the headquarters backup target, and combined with data backed up to that destination. The data may be consolidated at the headquarters backup target or elsewhere. If more than one path is available, a path may be selected based on path performance or some combination of paths in order to obtain optimized throughput, and this may be done by policy. The backup is performed, step 210.

When a failure is determined to be imminent, a backup may be initiated and the backup target specified to be different from the normal backup target. The backup target may be selected with data transfer speed as a criterion. Several backup targets may be available, and the fastest available target(s) may be selected. For example, a remote office may be geographically distant from the usual headquarters backup target to which it is connected by a low-bandwidth connection. Upon imminent failure determination, the backup target may be changed to a local backup target. This alternate backup target may be connected through a LAN which may use a much higher bandwidth connection, such as 1 Gbps, and permit more data elements to be backed up in less time, thus reducing the risk of loss of data and mitigating the loss in the event of failure. The alternate backup target may also be another storage device attached to the host system 50 via Fibre Channel, SCSI, SAS, or other high-speed connection, to maximize backup of data elements in a short period of time. More than one backup target may be selected, and more than one connection may be selected, to maximize data transfer in the indeterminate period before failure occurs. In some embodiments, several targets and/or connections may be specified, and when an imminent failure backup is to be performed, these targets and/or connections may be tested for speed and availability, so that the fastest available target(s) and/or connection(s) may be selected.

In some embodiments, the backup target may be specified by a policy triggered by the imminent failure, and depend on the specific failure threatened. For example, if the failure relates to a storage device 60 attached to host system 50, the backup target may be selected to be a storage device attached to host system 50 through a high-speed connection. If the failure relates to storage device 70, the backup target may be another storage device, such as storage device 40. The backup may be prioritized as described herein.

Figure 4:
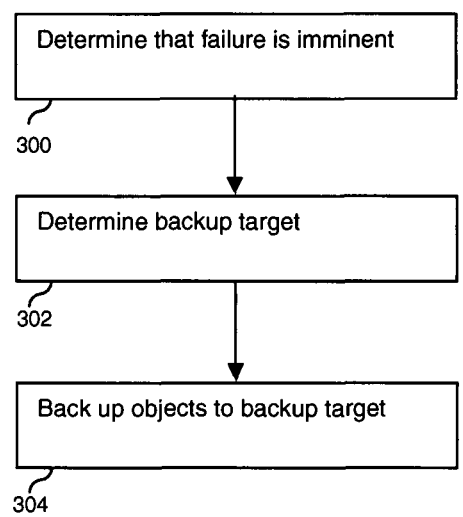
FIG. 4 is a flowchart illustrating a process for determining a target and backing up data to the target in some embodiments of the invention.

FIG. 4 illustrates a process flow in some embodiments. It is determined that a failure is imminent, step 300. The backup target is determined, step 302, and in step 304, objects are backed up to the target. By selecting a backup target with a higher bandwidth connection, the recovery process may also be expedited. For example, the failing component may be preemptively replaced or replaced post-failure, and the replacement may need to be populated with data elements recovered from the backup. By restoring from a backup target having a high-bandwidth connection, the restore time will be significantly reduced to hours if not minutes. By comparison, restoring several hundred gigabytes of data over a low-bandwidth connection could take weeks, even if 100% of the bandwidth were dedicated to the recovery.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for backing up objects, comprising:
receiving an indication of imminent failure, wherein the indication is received by a trigger, wherein the trigger includes a system poll, an interrupt, and a manual trigger;
identifying a component associated with the failure;
dynamically selecting a target based on the nature of the imminent failure, wherein based on the nature of the imminent failure includes based on the identified component, wherein the target is selected from a set of targets based on speed of data transfer as a criterion, wherein the speed of data transfer and availability of the target is determined dynamically, wherein the indication of the imminent failure is used to select a policy, wherein the policy indicates the set of targets, wherein the target is the fastest available target from the set of targets, wherein the policy includes at least one criterion for selecting the target from the set of targets and using the at least one criterion for selecting the target from the set of targets;
determining a second target from the set of targets and backing up at least a portion of the objects to the second target;
determining a fastest connection to the target for transferring objects, wherein backing up at least a portion of the objects is performed using the fastest connection;
determining at least one additional connection to the target for transferring objects, wherein backing up at least a portion of the objects is performed using the additional connection;
selecting objects to back up based on the component associated with the failure; and
backing up at least a portion of the selected objects to the target.

2. A system for backing up objects, comprising a processor configured to receive an indication of imminent failure, wherein the indication is received by a trigger, wherein the trigger includes a system poll, an interrupt, and a manual trigger, identify a component associated with the failure, dynamically select a target based on the nature of the imminent failure, wherein the target is selected from a set of targets based on speed of data transfer as a criterion, wherein the speed of data transfer and availability of the target is determined dynamically, wherein the indication of the imminent failure is used to select a policy, wherein the policy indicates the set of targets, wherein the target is the fastest available target from the set of targets, wherein the policy includes at least one criterion for selecting the target from the set of targets and using the at least one criterion for selecting the target from the set of targets, wherein based on the nature of the imminent failure includes based on the identified component, determine a second target from the set of targets and backing up at least a portion of the objects to the second target, determine a fastest connection to the target for transferring objects, wherein backing up at least a portion of the objects is performed using the fastest connection, determine at least one additional connection to the target for transferring objects, wherein backing up at least a portion of the objects is performed using the additional connection, select objects to back up based on the component associated with the failure, and back up at least a portion of the selected objects to the target.

3. A computer program product for backing up objects, comprising a non-transitory computer readable storage medium having program instructions embodied therein for:
receiving an indication of imminent failure, wherein the indication is received by a trigger, wherein the trigger includes a system poll, an interrupt, and a manual trigger;
identifying a component associated with the failure;
dynamically selecting a target based on the nature of the imminent failure, wherein based on the nature of the imminent failure includes based on the identified component, wherein the target is selected from a set of targets based on speed of data transfer as a criterion, wherein the speed of data transfer and availability of the target is determined dynamically, wherein the indication of the imminent failure is used to select a policy, wherein the policy indicates the set of targets, wherein the target is the fastest available target from the set of targets, wherein the policy includes at least one criterion for selecting the target from the set of targets and using the at least one criterion for selecting the target from the set of targets;
determining a second target from the set of targets and backing up at least a portion of the objects to the second target;
determining a fastest connection to the target for transferring objects, wherein backing up at least a portion of the objects is performed using the fastest connection;
determining at least one additional connection to the target for transferring objects, wherein backing up at least a portion of the objects is performed using the additional connection;
selecting objects to back up based on the component associated with the failure; and
backing up at least a portion of the selected objects to the target.

* * * * *